June 24, 1958 G. A. LYON 2,840,420
WHEEL COVER
Filed June 8, 1955
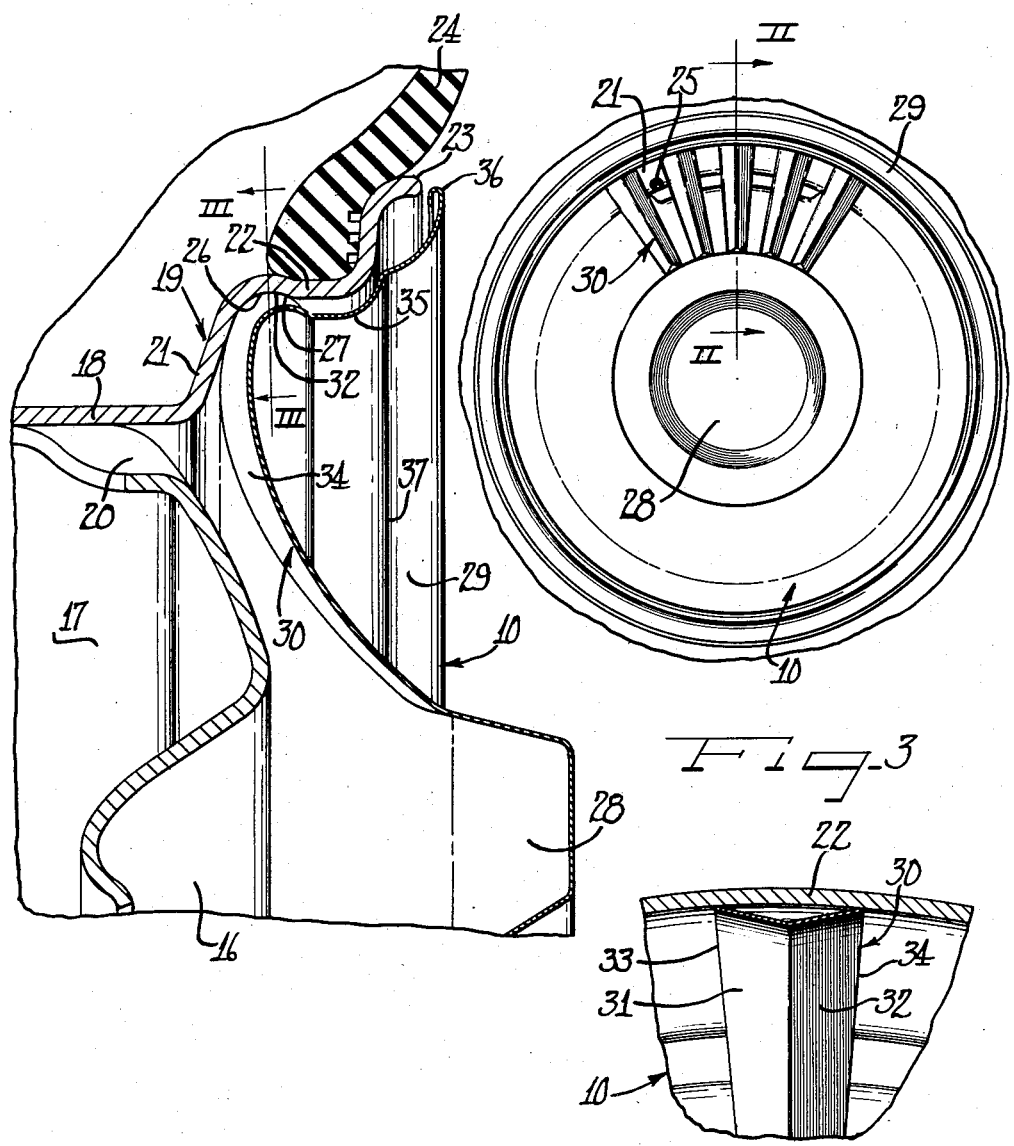
Inventor
George Albert Lyon

United States Patent Office 2,840,420
Patented June 24, 1958

2,840,420

WHEEL COVER

George Albert Lyon, Detroit, Mich.

Application June 8, 1955, Serial No. 513,954

12 Claims. (Cl. 301—37)

The present invention relates to improvements in wheel structures and more particularly concerns the ornamental and protective covering of the outer sides of vehicle wheels.

An important object of this invention is to provide an improved wheel structure of the safety rim type provided with a generally radially inwardly opening groove at the juncture of the side and intermediate flanges of the the tire rim and including improved cover means for snap-on, pry-off engagement with the wheel.

Another object of the present invention is to provide improved cover retaining means for snap-on pry-off cooperation with a grooved wheel member.

Still another important object of this invention relates to the provision of V-shaped resilient deflectable spoke elements each having divergent terminal edges which are capable of being bottomed in cover retaining engagement with the grooved wheel member.

Other objects, features and advantages of the present invention will be readily apparent from the following detailed description taken in conjunction with the accompanying drawings illustrating a single embodiment thereof, in which:

Figure 1 is a fragmentary side elevational view of a vehicle wheel structure embodying features of the present invention;

Figure 2 is an enlarged fragmentary cross-sectional view taken substantially on the line II—II of Figure 1; and Figure 3 is an enlarged fragmentary detail view of the cover of Figure 2 taken substantially on the line III—III thereof.

Referring now to Figures 1–3, a cover 10 is adapted to be disposed at the outer side of a vehicle wheel including a disk spider wheel body 16 having at the outer margin thereof a generally axially inwardly extending attachment flange 17 secured in any suitable manner to a base flange 18 of a stepped tire rim 19. At suitable intervals such as three or four, the flange 17 is inset to provide openings 20 through the wheel for air circulation and the like. The stepped rim flange 19 includes a generally radially projecting rim side flange 21 which is connected at its radially inner end to the flange 18 and at its radially outer end to a radially and axially outwardly extending intermediate flange 22 which joins a generally radially outwardly and axially outwardly terminal flange 23. The construction and relationship of the tire rim are such that a tire and tube assembly or a tubeless tire 24 can be supported thereon. For inflation of the tire a valve stem 25 (Figure 1) projects at a suitable place in the side flange 21 of the tire rim.

As shown in Figure 2, the tire rim is of the safety rim type provided at the axially inner side of the intermediate flange 22 with an annular radially inwardly opening groove 26 which at its axially inner side merges with the side flange 21 and provides at its axially outer side a generally axially and radially inwardly facing shoulder 27.

According to the present invention, the cover 10 is constructed and arranged to be retained on the wheel by interengagement of retaining means provided thereon with the groove 26 and more particularly with the shoulder 27.

To this end, the cover 10 comprises a stamped or drawn sheet metal member which in the present instance is of the full disk type and of a diameter to substantially entirely cover the outer side of the wheel. Any suitable sheet metal material or the like may be used in making the instant cover. The cover 10 includes a central crown area 28 and spaced radially outwardly from the crown area 28 is an annular outer marginal substantially outer cover portion 29 for overlying a substantial portion of the tire rim flange. Connecting the crown portion or area 28 and the outer marginal portion 29 is a series of circumferentially spaced, generally radially elongated resilient V-shaped spoke elements 30.

The spoke-like elements 30 are of a V-shaped configuration in a generally longitudinal direction and include divergently extending legs 31 and 32 which each terminate in a gripping extremity or edge 33 and 34 respectively. It will be appreciated that by reason of employing divergently extending legs better gripping capacities may be developed between the legs since the legs together by reason of the different angles of frictional engagement between the respective edges 33 and 34 and the tire rim tend to insure co-rotation of the wheel and the cover 10.

Another feature of the present construction is that the elements upon receiving a hard impact force from a stone or the like will tend slightly to diverge thereby cushioning the impact.

The elements 30 are each of a diameter slightly larger than the inner diameter of the groove 26 thereby necessitating the elements to be flexed when engaged with the rim flange 22. In so doing tensioned engagement may be effected between the cover and wheel.

The spoke-like elements 30 are of such a construction as to be capable of being longitudinally arched thereby providing better gripping capacities. To this end, the elements 30 are each backed up by the rigid crown area 28. By reason of this construction the elements may be firmly wedged behind the shoulder 27 when engaged with the wheel.

The retaining elements 30 are joined at their outer areas thereof to the outer annular terminal portion 29. The terminal portions of the spoke elements extend generally radially and then axially inwardly from the intermediate flange 22 axially outwardly from the groove shoulder 27. At their extremities the spoke terminals join a continuous annular generally axially inwardly extending inner marginal flange 35 and from which the remainder of the outer cover portion extends generally radially outwardly in spaced overlying relation to the terminal flange 23 and about the shoulder at the juncture of the terminal and intermediate flanges.

Provided on the outer extremity thereof, the cover portion 29 has an underturned reinforcing bead 36 which may be disposed in assembly adjacent to the tip of the terminal flange 23. Behind the outer cover portion 29 is provided a substantial chamber with the terminal flange to afford a concealed housing for wheel balancing weights. For rigidity and to provide a convenient inner pry-off shoulder, the outer annular portion 29 is provided with an intermediate generally axially inwardly indented annular rib 37 which is adapted to oppose in spaced adjacency the juncture shoulder between the terminal and intermediate flanges of the tire rim.

In mounting the cover 10 upon the outer side of the wheel, the cover is initially centered with respect to the wheel and the valve stem 25 is allowed to project through one of the openings between the circumferentially spaced spoke elements 30. At this point an axially inward pressure is then applied against the cover member and more particularly the outer annular portion 29 thereof to cause the spoke like elements 30 to cam axially and radially inwardly along the sloping face of the intermediate flange 22 until the retaining edges snap into edgewise engagement with the surface defining the rim groove 26 in nested edgewise bottomed engagement behind the shoulder 27. Hence, it will be appreciated that the spoke elements 30 are each axially and radially inwardly resiliently flexed thereby exerting an axially and radially outwardly tensioning reaction toward the juncture of the rim flanges 21 and 22 to assure firm edgewise retaining grip with the surface defining the groove 26.

For removing the cover from the wheel a pry-off tool such as a screwdriver or the like, may be applied behind the outer edge bead 36 and levered against the terminal flange 23, with additional pry-off leverage exerted against the reinforcing bead pry-off rim shoulder 37 as the tool is worked further onto the cover, until the retaining edges 33 and 34 of the cover are resiliently flexed out of the groove 26 and outward past the retaining shoulder 27.

It will be understood that modifications and variations may be effected without departing from the scope of the novel concepts of the present invention.

I claim as my invention:

1. In a wheel structure including body and rim parts provided with a cover retaining shoulder, a cover to be disposed on the wheel having a plurality of generally radially projecting circumferentially spaced resilient spoke-like cover retaining elements of generally V-shaped longitudinal configuration, said elements being capable of retaining said cover on said wheel when stressed into bottomed engagement in said cover retaining shoulder, each of said elements being spaced from one another and each element including an individual set of generally radial at least slightly arcuate, spaced edges for biased engagement behind said shoulder and to provide means for facilitating co-rotation of the cover and wheel.

2. In a wheel structure including body and rim parts provided with a cover retaining shoulder, a cover to be disposed on the wheel having a plurality of generally radially outwardly projecting circumferentially spaced resilient spoke-like cover retaining elements of generally V-shaped longitudinal configuration, said V-shaped longitudinal configuration of said elements including divergently angled terminal edges for edgewise cover retaining engagement behind said shoulder when said resilient elements are stressed into engagement with the wheel.

3. In a wheel structure including body and rim parts provided with a cover retaining shoulder facing generally radially and axially inwardly, a cover to be disposed on the wheel including radially inner and outer portions connected together by a plurality of generally radially outwardly projecting circumferentially spaced resilient spoke-like cover retaining elements of generally V-shaped longitudinal configuration including circumferentially spaced divergently angled terminal edges for edgewise cover retaining engagement with said shoulder when said resilient elements are stressed into engagement with the wheel, said elements being capable of being longitudinally arched when stressed into engagement with said shoulder thereby developing better gripping capacities.

4. In a wheel structure including body and rim parts provided with a cover retaining shoulder facing generally radially and axially inwardly, a cover to be disposed on the wheel including radially inner and outer portions connected together by a plurality of generally radially outwardly projecting circumferentially spaced resilient spoke-like cover retaining elements generally V-shaped longitudinal configuration including circumferentially spaced divergently angled terminal edges for edgewise cover retaining engagement with said shoulder when said resilient elements are stressed into engagement with the wheel, said outer portion being spaced radially inwardly from said cover retaining shoulder and projecting generally axially outwardly and connected to a generally axially inwardly extending annular continuous flange portion of said outer portion.

5. In a wheel structure including body and rim parts provided with a cover retaining shoulder facing generally radially and axially inwardly, a cover to be disposed on the wheel including radially inner and outer portions connected together by a plurality of generally radially outwardly projecting circumferentially spaced resilient spoke-like cover retaining elements of generally V-shaped longitudinal configuration including circumferentially spaced divergently angled terminal edges for edgewise cover retaining engagement with said shoulder when said resilient elements are stressed into engagement with the wheel, said outer portion being spaced radially inwardly from said cover retaining shoulder and projecting generally axially outwardly and connected to a generally axially inwardly extending annular continuous flange portion of said outer portion, said outer cover portion having intermediate the outer extremity thereof and the inner extremity thereof an indented annular pry-off rib enhancing the rigidity thereof and facilitating pry-off of the cover without damage.

6. In a wheel structure including body and rim parts with the rim part provided with an annular shoulder facing generally radially and axially inwardly, a cover to be disposed at the outer side of the wheel including a plurality of circumferentially spaced generally radially outwardly resilient spoke-like cover retaining elements, said spoke elements being of a V-shaped longitudinal configuration having divergently extending legs terminating in gripping terminal edges each of which supplements the gripping capacity of the other edge so as to have co-rotational movement of said cover and wheel, said spoke terminal edges being responsive to cover mounting pressures so as to be capable of being bottomed in said annular shoulder in tensioned engagement therewith.

7. In a wheel structure including body and rim parts with the rim part provided with an annular shoulder facing generally radially and axially inwardly, a cover to be disposed at the outer side of the wheel including a plurality of circumferentially spaced generally radially outwardly resilient spoke-like cover retaining elements, said spoke elements being of a V-shaped longitudinal configuration having divergently extending legs terminating in gripping terminal edges each of which supplements the gripping capacity of the other edge so as to have co-rotational movement of said cover and wheel, said spoke terminal edges being responsive to cover mounting pressure so as to be capable of being bottomed in said annular shoulder in tensioned snap-on pry-off engagement therewith, said cover being provided with an outer annular pry-off rib to facilitate the removal of the cover.

8. In a wheel structure including a stepped rim and body parts with the stepped rim part having an intermediate axially outwardly projecting and slightly radially inclined intermediate flange with an annular radially inset shoulder facing generally radially and axially inwardly thereon, a cover to be disposed at the outer side of the wheel including a plurality of circumferentially spaced generally radially outwardly projecting resilient deflectable spoke-like cover retaining elements, said spoke elements being of a V-shaped longitudinal configuration having divergently extending legs terminating in gripping terminal edges each of which supplements the gripping capacity of the other edge so as to have co-rotational movement of said cover and wheel, said resiliently deflectable elements being progressively cammed and flexed radially inwardly along said intermediate flange with said divergent edges nesting behind said radially inset shoulder in tensioned snap-on pry-off engagement therewith.

9. In a wheel structure including a stepped rim and body parts with the stepped rim part having an intermediate axially outwardly projecting and slightly radially inclined intermediate flange with an annular radially inset shoulder facing generally radially and axially inwardly thereon, a cover to be disposed at the outer side of the wheel including a plurality of circumferentially spaced generally radially outwardly projecting resilient deflectable spoke-like cover retaining elements, said spoke elements being of a V-shaped longitudinal configuration having divergently extending legs terminating in gripping terminal edges each of which supplements the gripping capacity of the other edge so as to have co-rotational movement of said cover and wheel, said resiliently deflectable elements being progressively cammed and flexed radially inwardly along said intermediate flange with said divergent edges nesting behind said radially inset shoulder in tensioned snap-on pry-off engagement therewith, said resilient deflected edges being disposed in a common circle having a diameter greater than that of the inner surface of said shoulder.

10. In a wheel structure including body and rim parts with the rim part provided with an annular shoulder facing generally radially and axially inwardly, a cover to be disposed at the outer side of the wheel including a plurality of circumferentially spaced generally radially outwardly resilient spoke-like cover retaining elements, said spoke elements being of a V-shaped longitudinal configuration having divergently extending legs terminating in gripping terminal edges each of which supplements the gripping capacity of the other edge so as to have co-rotational movement of said cover and wheel, said spoke terminal edges being responsive to cover mounting pressures so as to be capable of being bottomed behind said annular shoulder in tensioned engagement therewith, said divergent legs being capable of divergently flexing upon the cover when struck by an impact force thereby maintaining the cover in cushioned engagement with the wheel.

11. In a wheel structure including body and rim parts with one of the parts provided on the outer side of the wheel with an annular generally axially inwardly facing shoulder, a cover to be disposed at the outer side of the wheel including a plurality of circumferentially spaced generally radially extending resilient spoke-like cover retaining elements, said spoke elements being of a dished configuration having divergently extending legs terminating in gripping terminal edges each of which supplements the gripping capacity of the other so as to have co-rotational movement of said cover and wheel, said spoke terminal edges being responsive to cover mounting pressures so as to be capable of being bottomed behind said annular shoulder in tensioned engagement therewith, said divergent legs being capable of divergently flexing upon the cover when struck by an impact force thereby maintaining the cover in cushioned engagement with the wheel, said spoke terminal edges being arranged in a common circle having a diameter slightly at variance with the diameter of the annular shoulder so the edges may be maintained in detachable engagement behind said annular shoulder.

12. A cover for disposition on a vehicle wheel having a shoulder including radially inner and outer cover portions connected together by a plurality of generally radially projecting circumferentially spaced resilient spoke-like cover retaining elements of generally V-shaped configuration having spaced divergently angled terminal edges for edgewise cover retaining engagement with the shoulder when said resilient elements are stressed into engagement with the wheel, said elements being capable of being longitudinally arched when stressed into engagement with the shoulder thereby being self-retained upon the wheel.

References Cited in the file of this patent
UNITED STATES PATENTS

| | | |
|---|---|---|
| 2,102,471 | Lyon | Dec. 14, 1937 |
| 2,308,617 | Lyon | Jan. 19, 1943 |
| 2,732,262 | Buerger | Jan. 24, 1956 |